(12) United States Patent
Xu et al.

(10) Patent No.: US 9,916,121 B2
(45) Date of Patent: Mar. 13, 2018

(54) SUBSTRATE, DISPLAY SCREEN, SPLICING SCREEN AND ALIGNMENT METHOD OF SPLICING SCREEN

(71) Applicant: BOE TECHNOLOGY GROUP CO., LTD., Beijing (CN)

(72) Inventors: Chao Xu, Beijing (CN); Chunfang Zhang, Beijing (CN); Yan Wei, Beijing (CN); Heecheol Kim, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 70 days.

(21) Appl. No.: 14/361,879

(22) PCT Filed: Dec. 9, 2013

(86) PCT No.: PCT/CN2013/088830
§ 371 (c)(1),
(2) Date: May 30, 2014

(87) PCT Pub. No.: WO2015/010415
PCT Pub. Date: Jan. 29, 2015

(65) Prior Publication Data
US 2015/0205564 A1 Jul. 23, 2015

(30) Foreign Application Priority Data

Jul. 24, 2013 (CN) .......................... 2013 1 0314619

(51) Int. Cl.
*G06F 3/14* (2006.01)
*G02F 1/1333* (2006.01)

(52) U.S. Cl.
CPC ........ *G06F 3/1446* (2013.01); *G02F 1/13336* (2013.01); *G06F 3/1431* (2013.01); *Y10T 29/49117* (2015.01); *Y10T 428/24802* (2015.01)

(58) Field of Classification Search
CPC ....................................................... G06F 3/1446
See application file for complete search history.

(56) References Cited

U.S. PATENT DOCUMENTS 6,227,394 B1 * 5/2001 Shinoda .................. 220/2.1 A
2010/0055415 A1 * 3/2010 Belelie et al. ............ 428/195.1
(Continued)

FOREIGN PATENT DOCUMENTS

CN      101685217 A    3/2010
CN      103199084 A    7/2013
(Continued)

OTHER PUBLICATIONS

First Chinese Office Action dated Dec. 5, 2014; Appln. No. 201310314619.5.
(Continued)

*Primary Examiner* — Ian Rummel
(74) *Attorney, Agent, or Firm* — Ladas & Parry LLP; Loren K. Thompson (57) ABSTRACT

A substrate provided with alignment marks, a display screen, a splicing screen and an alignment method of splicing screen, in which, the splicing screen includes at least two display screens with alignment marks. A substrate of the display screen is provided with at least two alignment marks, and different alignment marks have a height difference therebetween which is larger or equal to a standard difference value. A narrow bezel splicing of display screens can be achieved by setting the alignment marks with different heights.

15 Claims, 6 Drawing Sheets

(56) References Cited

U.S. PATENT DOCUMENTS

2011/0109526 A1*  5/2011  Bauza et al. .................. 345/1.3
2012/0008144 A1*  1/2012  Kim et al. .................... 356/401
2014/0255653 A1*  9/2014  Weiss et al. ................. 428/158

FOREIGN PATENT DOCUMENTS

CN    103366648 U    10/2013
CN    203366657 U    12/2013

OTHER PUBLICATIONS

Written Opinion of the International Searching Authority dated Apr. 24, 2014; PCT/CN2013/088830.
International Search Report dated Jun. 12, 2014; Appln. No. PCT/CN2013/088830.

* cited by examiner

SUBSTRATE, DISPLAY SCREEN, SPLICING SCREEN AND ALIGNMENT METHOD OF SPLICING SCREEN

TECHNICAL FIELD

Embodiments of the present invention relate to a substrate provided with alignment marks, a display screen, a splicing screen and an alignment method of splicing screen.

BACKGROUND

The requirements on splicing technology of display screen and display device are progressively stricter as the increasingly wider application of Compact TV (i.e., narrow bezel TV) and Public Information Display (PID) splicing screen which are popular in recent years. A splicing screen is a large-framed screen constituted by a plurality of display screens which are arranged, as display units, in a matrix (e.g., 2×2, 3×3, 4×4 or even larger one based on freely unlimited splicing) for displaying a large-sized image with each display screen displaying a portion of the image or for respectively displaying different images on different display screens.

Figure 1:
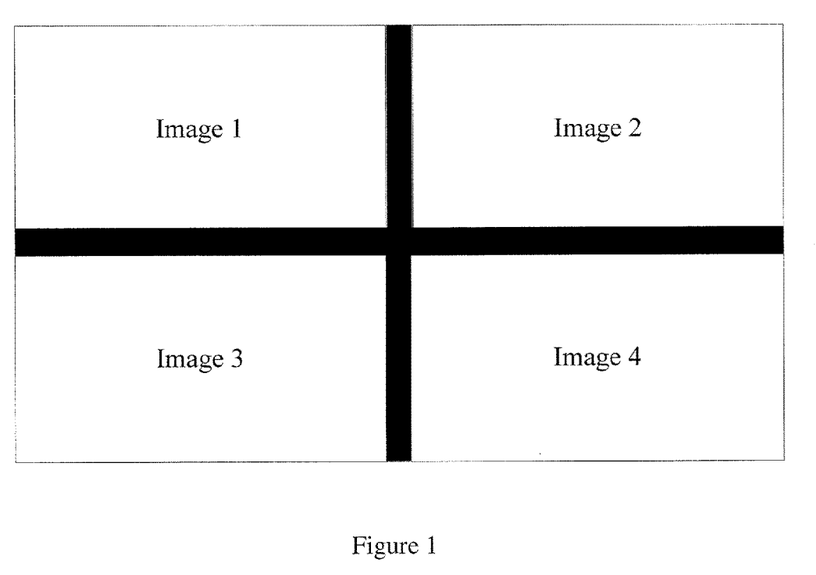
FIG. 1 is an effect view of a splicing screen according to prior art.

Input signals of a splicing screen are allocated to each of the display screens after completely processed by an image controller. The image displayed on each display screen can extend beyond a border of the display screen, which, however, usually needs to ensure a minimum gap between display screens. The display quality of an individual display screen will directly influence the display effect of the whole splicing screen which significantly varies depending on the type of the utilized display screen. An image processor, as one of the core devices of a splicing screen, serves for sending signals of computer, video and network to be displayed to an image splicing controller; the processed image signals are sent to corresponding display screens, respectively, with each display screen only displaying a portion of the entire image, so that a complete, large display frame can be established by combining all the portions on the display screens together. The resolution of the large display frame is a multiple of that of each display screens. However, the image processor can only make improvement in video processing, and the splicing effect presented by the splicing screen as obtained still involves a considerable wide splicing gap and can not meet the requirement of narrow splicing gap. As shown in FIG. 1, an example of a 2×2 splicing screen is illustrated, in which each display screen displays a small image.

Figure 2:
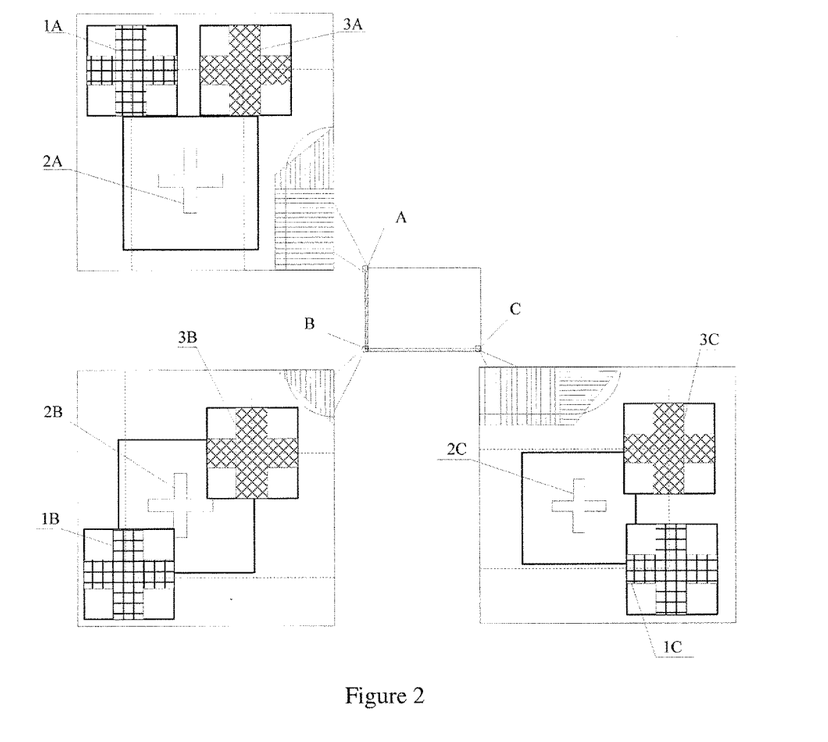
FIG. 2 is a schematic view showing a design of alignment marks disposed around a narrow bezel splicing screen according to a conventional technology.
Figure 3:
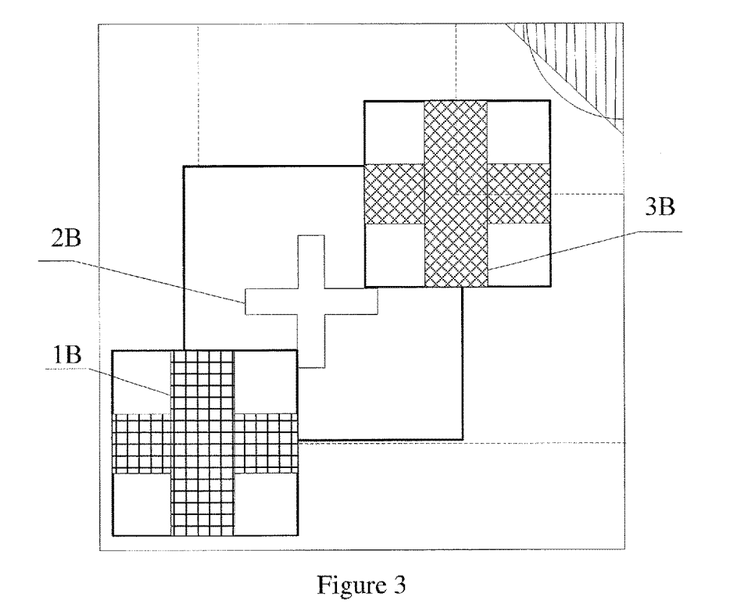
FIG. 3 is a schematic view showing a distribution of three alignment marks at a lower left area according to a conventional technology.

The technology of narrow bezel splicing screen in conventional technology is to narrow the bezel width of each display screen to achieve an objective of narrowing the splicing gap between the spliced screens after completion of splicing. FIG. 2 is a schematic view showing the design of alignment marks disposed around the narrow bezel splicing screen according to a conventional technique. In the figure, A, B and C are representative of the upper left corner, lower left corner and lower right corner of a small display screen, respectively; 1A, 2A and 3A are representative of three alignment marks at the upper left corner; 1B, 2B and 3B are representative of three alignment marks at the lower left corner; 1C, 2C and 3C are representative of three alignment marks at the lower right corner. Each of the alignment marks has an exclusive area around it for excluding any image therein. The alignment mark has an area of 0.5 mm×0.5 mm, and its exclusive area has an area of 1.5 mm×1.5 mm. If there are other images extending into the scope of the exclusive area of the alignment mark, the production line will generate an alarm and fail to tape-out. As shown in FIG. 2, the three alignment marks at the upper left corner and their exclusive areas are not overlapped with each other, thus it will not result in a tape-out failure. However, the three alignment marks at the lower left corner, the three alignment marks at the lower right corner, and the respective exclusive areas of these alignment marks are overlapped one another, especially the exclusive areas of the alignment marks 1B, 2B and 3B at the lower left corner are considerably overlapped with each other. As shown in the enlarged view of FIG. 3, the lower left corner of the exclusive area of alignment mark 2B is partially overlapped with the alignment mark 1B, and the upper right corner of the exclusive area of alignment mark 2B is partially overlapped with the exclusive area of alignment mark 3B, resulting in that some of the images are extending into the exclusive areas of alignment marks, which leads to a tape-out failure.

For achieving a narrow bezel of a splicing screen, the existing process allowance has to be reduced to the minimum, so as to reduce the width of the display screen at the alignment mark and the width of the alignment mark on the substrate, so as to improve accuracy and standard. However, merely relying on reducing the existing process allowance contributes little to the narrowing of the bezel of splicing screen, and problems that influence the display effect of the splicing screen remains unsolved.

SUMMARY

Embodiments of the present invention provide a substrate provided with alignment marks; the substrate comprises at least two alignment marks thereon, wherein different alignment marks have a height difference therebetween. The height difference is N time(s) of a standard difference value, where N≥1.

For example, the standard difference value is 2000 Å.

For example, the height difference is 5000 Å.

For example, the alignment marks are provided in a front side and/or a back side of the substrate.

For example, the alignment marks having a height difference are formed in a same film layer; or, the alignment marks having a height difference are formed in different film layers.

Embodiments of the present invention also provide a display screen comprising at least one of the substrate.

Embodiments of the present invention also provide a splicing screen comprising at least two display screens, and the display screen is just the described one.

Embodiments of the present invention also provide an alignment method of a splicing screen, comprising: providing alignment marks having a height difference on a display screen; and when splicing at least two display screens together, positioning and splicing are performed by adjusting a focal length of an image observation apparatus to align the alignment marks with targeted alignment marks.

For example, the height difference is 2000 Å.

For example, step of providing alignment marks having height difference on a display screen comprises forming the alignment marks having a height difference in a same film layer; or in different film layers.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

The First Embodiment

The first embodiment of the present invention provides a substrate provided with alignment marks; the substrate comprises at least two alignment marks thereon. Different alignment marks have a height difference therebetween which is N time(s) of a standard difference value, where N≥1. The standard difference value is the resolution or measurement accuracy of an image observation apparatus used in the splicing process.

The image observation apparatus in the present embodiment can be a camera or other image observation apparatuses with higher accuracy, such as a microscope. Hereinafter the description is given under the case of microscope, for example. The focal length of the microscope is adjustable within a considerable wider range. Different alignment marks with different heights have to be observed at different focal lengths. Given the same focal length, since different alignment marks have different heights, only the alignment mark corresponding to the selected focal length is clearly observed while the remaining alignment marks are obscure. Therefore, the alignment marks having height difference can be distinguished from each other, so as to avoid any interference between alignment marks.

When performing recognizing and aligning according to the alignment marks, the alignment marks having different heights are observed through the image observation apparatus by using different focal lengths, with the magnitude of the focal length being correspondingly adjusted according to the heights of the alignment marks.

The alignment marks can have height difference by configuring the alignment marks to have different heights. In a conventional technology, two alignment marks can not be distinguished from each other if the exclusive area of one is overlapped with the exclusive area of the other, which results in incorrect positioning during splicing, and thus leads to a relatively wider bezel of the splicing screen. In embodiments of the present invention, two alignment marks with overlapped exclusive areas can be distinguished from each other, even if these two alignment marks are extremely close to one another, because different alignment marks have height difference therebetween. In this way, an accurate positioning can be achieved, which is helpful for a process implemented on the basis of alignment marks to obtain better effects.

The standard difference value depends on the distinguishable distance or measurement accuracy of the image observation apparatus utilized during the splicing process. For example, if the minimum resolution of the microscope used for observation is 2000 Å, the minimum magnitude of the standard difference value is 2000 Å. When the standard difference value is 2000 Å, two alignment marks having different heights can be distinguished from each other. It is to be understood that under circumstance of such resolution, the value 2000 Å is the lowest value for configuring the standard difference value, but it is not limited thereto; instead, it can be a value above 2000 Å. When the standard difference value is 2000 Å, better effect is achieved with a height difference of 5000 Å.

If the resolution or minimum distinguishable distance of the utilized observation apparatus is lower than 2000 Å, the minimum standard difference value as selected can be smaller; as a result of which the minimum height difference can also be decreased below the current value of 2000 Å. For example, if the minimum distinguishable distance of the utilized apparatus for observation is 1000 Å, the height difference can be set at a value above 1000 Å, then the minimum standard difference value is just 1000 Å and the height difference value can be above or equal to 1000 Å. Likewise, the standard difference value and height difference as selected under other resolution condition can vary correspondingly, as long as the height difference is N time(s) of the standard difference value.

The alignment marks can be located on the front side and/or back side of the substrate. For forming alignment marks on the back side of the substrate, it has no need of considering the structure of the display region. For forming alignment marks on the front side of the substrate, it needs to consider other structures of the display region. The alignment marks having height difference are formed by the following two manners: forming the alignment marks having a height difference in a same film layer; or, forming the alignment marks having a height difference in different film layers.

Hereinafter the description will be given under both the case of forming alignment marks having height difference in a same film layer on the back side of the substrate and the case of forming alignment marks having height difference in different film layers on the back side of the substrate.

Figure 4:
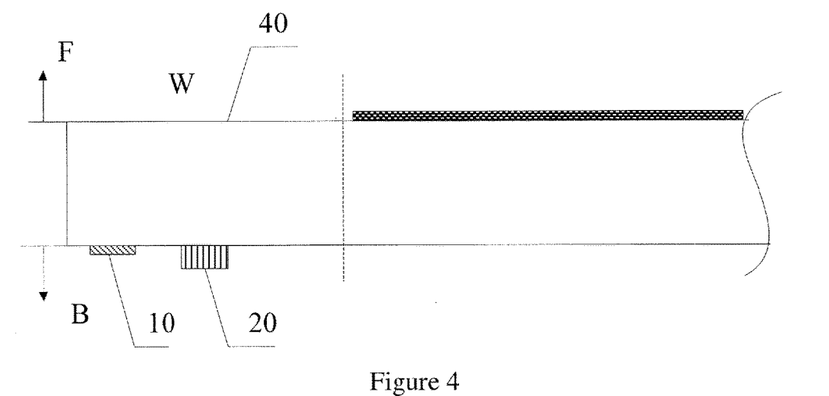
FIG. 4 is a schematic view showing a substrate provided with alignment marks in which the alignment marks are disposed in a front side of the substrate according to an embodiment of the present invention.

For forming alignment marks having height difference on the same film layer on the back side of the substrate, firstly forming a film layer on the back side of the substrate through once deposition; then coating a photoresist; illuminating and developing the photoresist by a MASK to form a desired pattern on the photoresist; and then, etching the film layer to remove excess height according to a preset height for each alignment mark, so as to obtain alignment marks with required heights. For example, in the present embodiment, an explanation will be given in terms of the two alignment marks at the corresponding lower left corner in FIG. 3. First, a film layer is deposited and formed at the outside region W of the effective display region on the back side B of the substrate; then the same film layer is etched by patterning process, i.e., etching according to the preset heights of alignment marks; finally alignment marks Mark1 and Mark2 are obtained corresponding to numeral references 10 and 20. As shown in FIG. 4, the height difference between alignment marks Mark1 and Mark2 is one time of the standard difference value, which is, for example, 2000 Å. Further, the height difference between the alignment marks Mark1 and Mark2 can be N time(s) of the standard difference value, where N≥1.

It should be understood that the above-described alignment marks can also be formed in different film layers on the back side of the substrate. Regardless of whether the alignment marks are disposed in the same layer or different layers, the height difference can be configured arbitrarily when deposition and etching are conducted on the back side of the substrate, because the alignment marks are independent relative to the front side. The magnitude of the height difference is in direct proportion to the measurement accuracy of the image observation apparatus. As an embodiment of the present invention, a microscope that serves as the image observation apparatus has a measurement accuracy up to 2000 Å, thus the height difference between alignment marks as configured can be N time(s) of 2000 Å, so that two alignment marks having height difference can be distinguished from each other under the microscope by adjusting the focal length to different values.

In some cases, the alignment marks can be disposed on the front side of the substrate according to process requirements. If the alignment marks are disposed on the front side of the substrate, the pattern of the alignment marks can be formed in a patterning process for a conventional TFT without using additional MASK, thus no increased cost will occur.

Forming alignment marks on the front side of the substrate would influence a normal display of the display screen because the front side of the substrate has to function for displaying. Therefore, in order to avoid any influence to the normal display, it's possible to dispose the alignment marks in different layers at outside region W of the effective display region on the display screen. Such alignment marks can be formed through patterning process. Similar with the foregoing embodiment, the alignment marks can be formed by steps of depositing, photoresist patterning, etching, and the like. The two different layers where the alignment marks are disposed can be any layers forming the display region structure. Hereinafter, the description will be given under the case of gate insulating layer and semiconductor active layer for examples.

Figure 5:
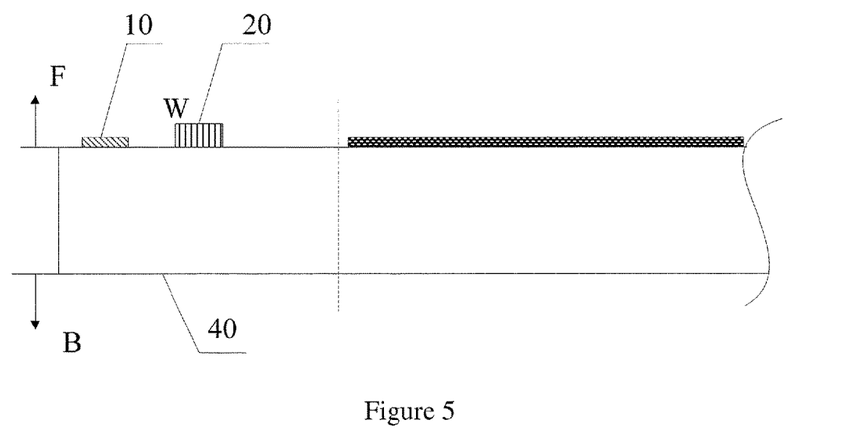
FIG. 5 is a schematic view showing a substrate provided with alignment marks in which the alignment marks are disposed in a back side of the substrate according to an embodiment of the present invention.

First, a gate insulating layer is deposited on the front side of the substrate; then a photoresist is coated thereover; the photoresist is illuminated and developed by a MASK to form a desired pattern on the photoresist; and then, the gate insulating layer is etched. At the same time of forming the pattern of the gate insulating layer, a pattern of alignment mark Mark 1 at the outside region W of the effective display region is obtained. This pattern is obtained for Mark1 according to a first preset height. Afterward, a semiconductor active layer is deposited thereover; then a photoresist is coated; the photoresist is illuminated and developed by a MASK to form a desired pattern on the photoresist; and then, the semiconductor active layer is etched. At the same time of forming the pattern of the semiconductor active layer, the alignment mark Mark2 at the outside region W of the effective display area is obtained. This pattern is obtained for Mark2 according to a second preset height. In this way, the alignment marks Mark1 and Mark2 have a preset height difference. The alignment marks Mark1 and Mark2 obtained by the above-mentioned process are both disposed in different layers on the front side of the substrate, thereby alignments marks Mark1 and Mark2 having height difference are obtained by etching different layers on the front side of the substrate. These two alignment marks corresponding to numeral references 10 and 20, respectively, as shown in FIG. 5, have a height difference which is N time(s) of a standard difference value. The standard different value can be 2000 Å. It is to be understood that it is also possible to form two alignment marks having height difference in a same layer on the front side F of the substrate by patterning process, in a manner similar with the foregoing method of etching the same layer with reference to FIG. 4. As it can be seen from the etching method of alignment marks shown in FIGS. 4-5: regardless of whether the alignment marks having height difference are disposed on the front side or the back side of the substrate, different alignment marks can be formed in a same layer, or can also be formed in different layers.

Although the foregoing description is made with reference to FIGS. 4-5 in which two alignment marks are formed, the above-described method of forming alignment marks having height difference is also applicable for forming three and more alignment marks.

In general, a substrate having alignment marks with height difference allows distinguishing the alignment mark areas having overlapped exclusive areas or having extremely close locations from each other, thus allows achieving better process effect by performing accurate recognizing and positioning according to the distinguished alignment marks during respective processes.

Based on the substrate provided with alignment mark according to embodiments of the present invention, embodiments of the present invention further provide a display screen comprising at least one substrate provided with alignment marks. For an LCD screen, for example, the above-mentioned substrate can be an opposed substrate (such as color filter substrate) and/or an array substrate, and the alignment marks having height difference can be disposed outside the effective display region on the array substrate or opposed substrate.

Apart from the above-mentioned substrate, the above-mentioned display screen can further comprise a backlight to provide a light source required by the display screen to achieve display function. It is to be understood that, in addition to a LC module assembled from the above-mentioned substrate and backlight, the display screen further comprises other structures which are necessary for the display device to achieve the display function, and detailed description thereto will not be described herein.

It is also to be understood that the display screen of the present embodiment is described in terms of LCD screen for example, which description is also applicable for other display screens to achieve the display function.

Therefore, when observed under microscope, the display screen provided with alignment marks according to the present embodiment allows distinguishing alignment marks which have overlapped exclusive areas or have extremely close locations from each other, thus allows achieving better process effect by accurately performing recognizing and positioning according to the distinguished alignment marks during respective processes.

The Second Embodiment

The second embodiment of the present invention provides a splicing screen comprising at least two display screens, which display screen is the one provided by the first embodiment above.

The present embodiment provides three alignment marks Mark1, Mark2 and Mark3 which are necessary for use in different process flows, wherein Mark1 is the mark necessary for use in the Cell process to perform cutting; Mark2 is the mark for use in Module process, POL (polarizer lamination) process and OLB (outer lead bonding) process to perform aligning; and Mark3 is the mark for use in UV (ultraviolet curing) process and BM (black matrix) alignment to perform aligning. These three alignment marks all have exclusive areas of their own, in which any image is forbidden to present. It will result in an inaccurate positioning if an exclusive area of an alignment mark is overlapped with another exclusive area of a different alignment mark.

For an LC panel, for example, the above-mentioned three alignment marks Mark1, Mark2 and Mark3 are all disposed at the outside region W of the effective display region on the LC panel, increasingly or decreasingly arranged on the LC panel, successively.

When a plurality of display screens are spliced, it requires an image observation apparatus for use in positioning, which is typically a camera or a microscope. The height difference between alignment marks is larger or equal to a standard difference value. If the image observation apparatus has a minimum resolution of 2000 Å, i.e., if the standard difference value is 2000 Å, it's capable of distinguishing two alignment marks having different heights from each other. It is to be understood that, under such circumstance, the value 2000 Å is the lowest value for configuring the standard difference value, but it is not limited thereto but can be a value above 2000 Å. When the standard difference value is selected as 2000 Å, better effect is achieved with a height difference of 5000 Å.

If the resolution or minimum distinguishable distance of the observation apparatus is lower than 2000 Å, the minimum standard difference value as selected can be smaller; as a result, the minimum height difference can also be decreased below the current value of 2000 Å. For example, if the minimum distinguishable distance of the utilized apparatus for observation is 1000 Å, the height difference can be set at a value above 1000 Å, then the minimum standard difference value is 1000 Å and the height difference can be above or equal to 1000 Å. Likewise, the standard difference value and height difference as selected under other resolutions can vary correspondingly, as long as the height difference is N time(s) of the standard difference value, where N≥1.

Figure 6:
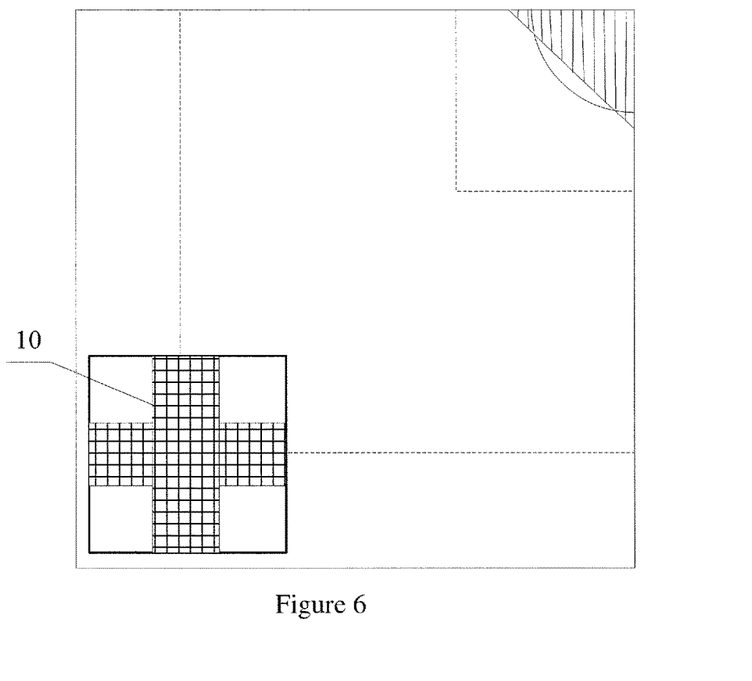
FIG. 6 shows an alignment mark Mark1 and its exclusive area in a splicing screen according to an embodiment of the present invention.
Figure 7:
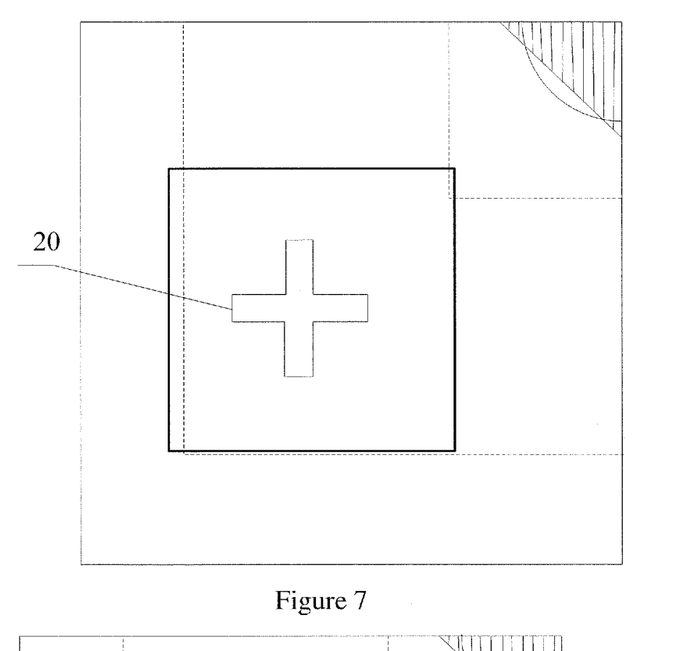
FIG. 7 shows an alignment mark Mark2 and its exclusive area in a splicing screen according to an embodiment of the present invention.
Figure 8:
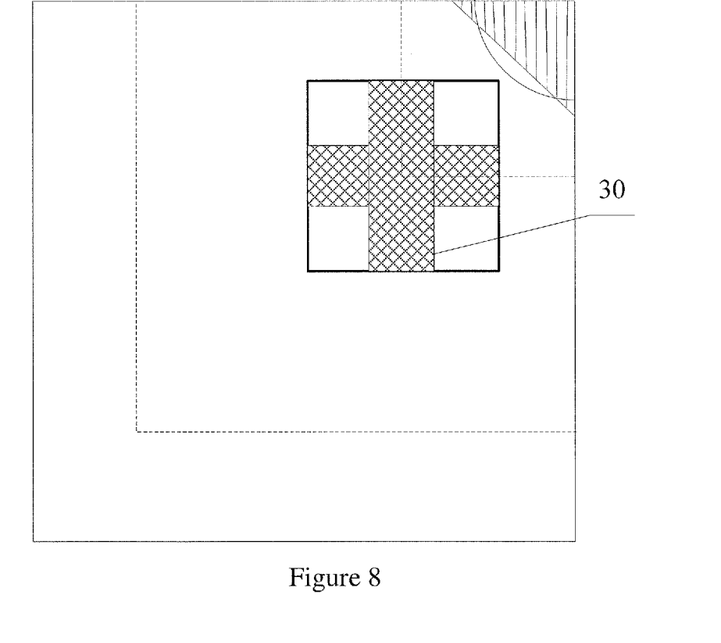
FIG. 8 shows an alignment mark Mark3 and its exclusive area in a splicing screen according to an embodiment of the present invention.

FIG. 6 shows an alignment mark and its exclusive area as observed at a focal length selected according to alignment mark Mark1 during the Cell assembling process; FIG. 7 shows an alignment mark and its exclusive area as observed at a focal length selected according to alignment mark Mark2 during the POL&OLB process. FIG. 8 shows an alignment mark and its exclusive area as observed at a focal length selected according to alignment mark Mark3 during the UV process.

Figure 9:
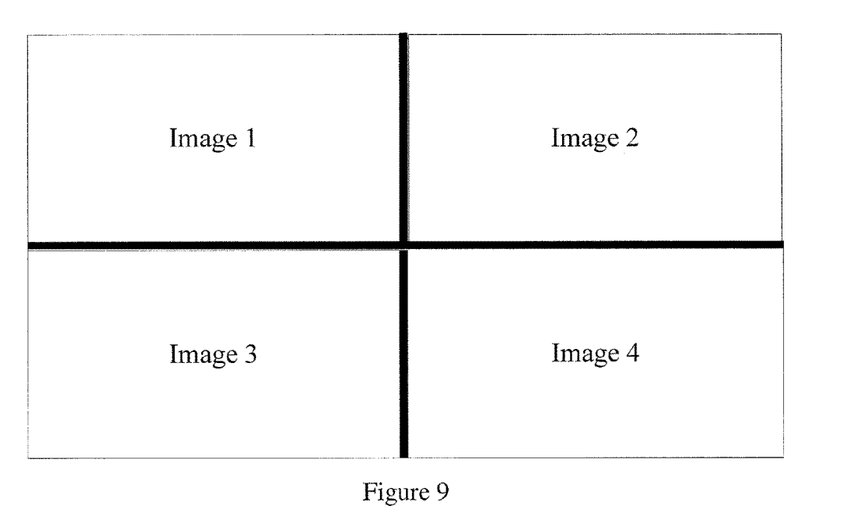
FIG. 9 is a splicing effect view represented by a splicing screen according to an embodiment of the present invention.

For splicing display screens by using alignment marks having height difference as provided by the present embodiment, if the exclusive areas of different alignment marks are overlapped with each other, an image observation apparatus can only observe the alignment mark corresponding to a selected focal length and the exclusive area thereof, while the remaining alignment marks and their exclusive areas are invisible when the image observation apparatus is used to perform recognizing and aligning through using the selected focal length. Therefore it will not influence the process of recognizing and aligning even if the exclusive areas of the alignment marks are partially overlapped. The effect of a screen splicing as obtained by the above-mentioned splicing process is shown in FIG. 9, which significantly narrows splicing gaps as compared with that of a splicing screen according to prior art. For a large-sized splicing screen (above 46'), the original splicing gap raging from 7 to 10 mm can be decreased to 4-6 mm by performing splicing using the substrate having alignment marks with height difference as provided by embodiments of the present invention.

In the narrow bezel splicing screen as provided by the present embodiment, the alignment marks disposed outside the effective display region on the panel are configured to have height difference, so that when performing recognizing and aligning, it only needs to adjust the focal length of the image observation apparatus to allow only one alignment mark and its exclusive area being observed at the same focal length. In this way, it will not create any interference even if different alignment marks are arranged together. Therefore, it's possible to dispose different alignment marks at relatively closer locations so as to achieve narrow bezel splicing.

In general, in the narrow bezel splicing screen as provided by the present embodiment, the alignment marks disposed outside the effective display region on the panel are configured to have different heights so that different alignment marks have a height difference therebetween. In this way, when performing recognizing and aligning, it allows only one alignment mark and its exclusive area displayed in the image by setting the image observation apparatus at one focal length. Thus it will not create any interference even if there are different alignment marks arranged together, so as to precisely and accurately perform aligning and achieve narrow bezel splicing of display screens.

The Third Embodiment

Figure 10:
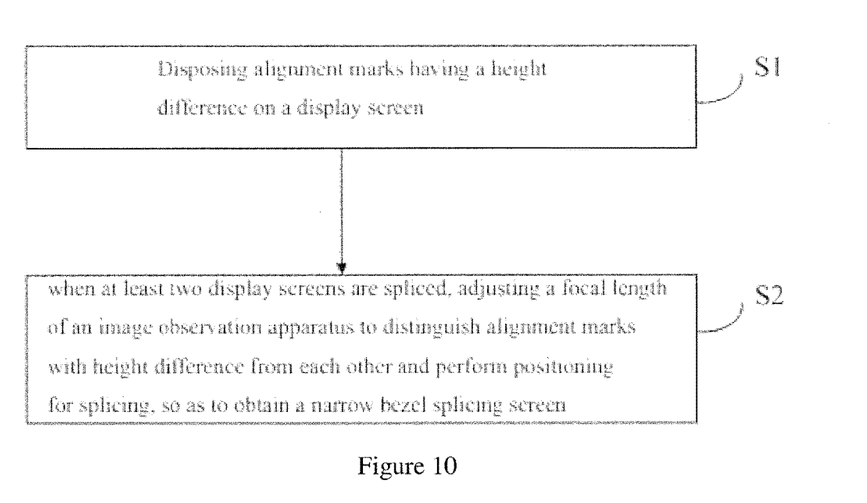
FIG. 10 is a flow chart of an alignment method of splicing screen according to an embodiment of the present invention.

The third embodiment provides a method of obtaining narrow bezel splicing screen. The flow chart is shown in FIG. 10, comprising the following steps.

Step S1, alignment marks having a height difference are disposed on a display screen.

For example, the height difference is N time(s) of a standard difference value, where N≥1. The standard difference value is the resolution or measurement accuracy of the image observation apparatus used in the splicing process.

For an LCD screen, for example, the display screen comprises a backlight and an LC panel; the LC panel is an LC panel based on an alignment mark and can further comprise an opposed substrate (e.g., a color filter substrate), an array substrate, and LC located between the opposed substrate and the array substrate. The alignment marks are disposed outside the effective display region on the array substrate or the opposed substrate; and the array substrate and/or the opposed substrate are/is substrate(s) on which the alignment marks as disposed have height difference. The display screen can also be other display screens for achieving display function besides the LC display panel.

In step S1, Alignment marks having a height difference are disposed by the following steps.

The alignment marks having a height difference are formed by etching a same layer; or, the alignment marks having a height difference are formed by respectively etching different layers. This process has been particularly described in the first embodiment, it is not repeated herein.

Step S2, when at least two display screens are spliced, a focal length of an image observation apparatus is adjusted to align the alignment marks with targeted alignment marks.

Since it can only display one alignment mark and its exclusive area in the image under a configured focal length by adjusting the focal length of the image observation apparatus, the alignment marks having height difference can be distinguished from each other so as to accurately perform aligning, and thus perform positioning for splicing, thereby obtaining a narrow bezel splicing screen.

When performing recognizing and aligning, the alignment marks having different heights corresponds to different focal lengths of the image observation apparatus. During different processes, it needs to select corresponding focal length for observation according to the alignment mark required by the current process. For example, if it needs to perform positioning according to the alignment mark Mark1 in the Cell assembling process, the image observation apparatus has to be adjusted to a focal length corresponding to the height of Mark1; if it needs to perform positioning according to the alignment mark Mark2 in the POL&OLB process, the image observation apparatus has to be adjusted to a focal length corresponding to the height of Mark2; if it needs to perform positioning according to the alignment mark Mark3 in the UV process, the image observation apparatus has to be adjusted to a focal length corresponding to the height of Mark3.

During a certain process, when it has selected a focal length for the image observation apparatus corresponding to an alignment mark required by this process, only this alignment mark can be observed while the remaining alignment marks are invisible under this focal length; thus it's readily to distinguish different alignment marks from each other. Since the exclusive area of alignment mark is forbidden to present any image therein, it's required that: during a certain process, only an alignment mark as needed by this process can be observed while the remaining alignment marks are excluded from the display region. This avoids any interference between the alignment marks. For a Cell process, POL&OLB process and UV process, for example, the alignment marks and their exclusive areas as observed in these three process flows are shown in FIGS. 6-8. It will not create any interference even if there are different alignment marks arranged together, thus it's possible to dispose different alignment marks at relatively closer location to achieve narrow bezel splicing and hence to narrow the splicing gap. For a large-sized (above 46') splicing screen, the original splicing gap ranging from 7 to 10 mm can be decreased to 4-6 mm.

The minimum standard difference value depends on the maximum resolution of the utilized microscope. For example, if the minimum distinguishable distance of the microscope is 2000 Å, the magnitude of the standard difference value can be 2000 Å. With the standard difference value of 2000 Å, two alignment marks having different heights can be distinguished from each other. Then, the height difference as configured can be N time(s) of 2000 Å, where N≥1, i.e., the height difference can be a value above 2000 Å. It is to be understood that, under such circumstance, the value 2000 Å is the lowest for configuring the standard difference value, but it is not limited thereto. For example, it can also be a value above 2000 Å. When the minimum distinguishable distance is 2000 Å, better effect is achieved with a height difference of 5000 Å. If the minimum distinguishable distance of the utilized microscope is 1000 Å, the standard difference value can be a value above 1000 Å, then the minimum standard difference value is 1000 Å and the height difference can be above or equal to 1000 Å. Likewise, the standard difference value and height difference as selected under other resolution can vary correspondingly, as long as the height difference is N time(s) of the standard difference value, where N≥1.

With the splicing method of narrow bezel splicing screen as provided by the present embodiment, it has no need to change the positions of alignment marks which are overlapped in conventional process; instead, it is to configure the alignment marks disposed outside the effective display region on the panel to have different heights, so that different alignment marks can have obvious height difference therebetween. When performing recognizing and aligning, it merely needs to adjust the focal length of the display apparatus, because only one alignment mark and its exclusive area are observed at the same focal length. It will not create any interference even if there are different alignment marks arranged together, thus it's possible to dispose different alignment marks at relatively closer locations to achieve narrow bezel splicing.

Embodiments of the present invention provide a substrate provided with alignment marks, a display screen, a splicing screen, and an alignment method of splicing screen. By configuring the alignment marks disposed outside the effective display region on the display screen to have height difference, the alignment marks with overlapped exclusive areas can be distinguished from each other by utilizing an image observation apparatus. When recognizing and aligning a plurality of display screens for splicing them, it will not create any interference even if there are different alignment marks arranged together, so as to achieve precise positioning during splicing the display screens, and obtain a splicing screen with narrow bezel.

It is understood that the described above are just exemplary implementations and embodiments to explain the present invention and the invention is not intended to limit thereto. An ordinary person in the art can make various variations and modifications to the present invention without departure from the spirit and the scope of the present invention, and such variations and modifications and their equivalents shall fall in the scope of the present invention.

What is claimed is:

1. A splicing screen, comprising at least two display screens each with a substrate, wherein the substrate comprises:
at least two alignment marks on the substrate, wherein each of the at least two alignment marks has an exclusive area around it, different alignment marks have a height difference therebetween, the height difference is N time(s) of a standard difference value 1000 Å, which refers to a resolution or minimum distinguishable distance of an image observation apparatus utilized during a splicing process, to allow any two alignment marks with overlapped exclusive areas to be distinguished from each other, where N is an integer or half integer equal to or larger than 2.

2. The splicing screen according to claim 1, wherein the height difference is 2000 Å.

3. The splicing screen according to claim 1, wherein the height difference is 5000 Å.

4. The splicing screen according to claim 1, wherein the alignment marks are provided on a front side and/or a back side of the substrate.

5. The splicing screen according to claim 1, wherein the alignment marks having a height difference therebetween are formed in a same film layer; or the alignment marks having a height difference therebetween are formed in different film layers.

6. The splicing screen according to claim 2, wherein the alignment marks are provided on a front side and/or a back side of the substrate.

7. The splicing screen according to claim 3, wherein the alignment marks are provided on a front side and/or a back side of the substrate.

8. The splicing screen according to claim 2, wherein the alignment marks having a height difference therebetween are formed in a same film layer; or the alignment marks having a height difference therebetween are formed in different film layers.

9. The splicing screen according to claim 3, wherein the alignment marks having a height difference therebetween are formed in a same film layer; or the alignment marks having a height difference therebetween are formed in different film layers.

10. The splicing screen according to claim 4, wherein the alignment marks having a height difference therebetween are formed in a same film layer; or the alignment marks having a height difference therebetween are formed in different film layers.

11. The splicing screen according to claim 6, wherein the alignment marks having a height difference therebetween are formed in a same film layer; or the alignment marks having a height difference therebetween are formed in different film layers.

12. An alignment method of a splicing screen, comprising:
providing alignment marks having a height difference on a display screen, wherein each of the at least two alignment marks has an exclusive area around it, the height difference is N time(s) of a standard difference value 1000 Å, which refers to a resolution or minimum distinguishable distance of an image observation apparatus utilized during a splicing process, to allow any two alignment marks with overlapped exclusive areas to be distinguished from each other, where N is an integer or half integer equal or larger than 2; and
performing positioning and splicing by adjusting a focal length of the image observation apparatus to align the alignment marks with targeted alignment marks when splicing at least two display screens together.

13. The method according to claim 12, wherein the height difference is 2000 Å.

14. The method according to claim 12, further comprising: forming the alignment marks having a height difference therebetween in a same film layer; or forming the alignment marks having a height difference therebetween in different film layers.

15. The method according to claim 13, further comprising:
forming the alignment marks having a height difference therebetween in a same film layer; or forming the alignment marks having a height difference therebetween in different film layers.

* * * * *